United States Patent [19]

Rotolo

[11] Patent Number: 4,479,457

[45] Date of Patent: Oct. 30, 1984

[54] PROTECTIVE ELBOW PAD FOR DOGS AND METHOD

[76] Inventor: Frank J. Rotolo, 619 N. Erin Blvd., Tucson, Ariz. 85711

[21] Appl. No.: 435,985

[22] Filed: Oct. 22, 1982

[51] Int. Cl.³ ..................... A01K 29/00; A61F 13/00
[52] U.S. Cl. ................................. 119/143; 128/149; 128/165
[58] Field of Search ............... 119/143; 128/133, 149, 128/153, 165; 54/79, 80; 2/22, 24

[56] References Cited

U.S. PATENT DOCUMENTS

| | | | |
|---|---|---|---|
| 1,073,478 | 9/1913 | Dodd | 128/133 |
| 2,592,739 | 4/1952 | Richardson | 128/149 |
| 3,209,516 | 10/1965 | Hyman | 119/143 X |
| 3,721,237 | 3/1973 | Alessio | 128/153 X |
| 3,791,383 | 2/1974 | Friedman | 128/133 X |
| 4,272,850 | 6/1981 | Rule | 2/24 |
| 4,299,214 | 11/1981 | Sweitzer | 128/165 |
| 4,377,284 | 3/1983 | Okerlin | 128/133 X |

*Primary Examiner*—Robert P. Swiatek
*Attorney, Agent, or Firm*—Brisebois & Kruger

[57] ABSTRACT

A protector for the elbows of canines which includes a strap arrangement for maintaining the elbow protectors in an upper position on the elbows of the animal and which extend over the animal's shoulders or back. The protector has a configuration conforming to the elbow of the canine around which it is placed and is of laminated construction with a foam layer sandwiched between the layer of felt-like material and a synthetic sheet, respectively.

11 Claims, 4 Drawing Figures

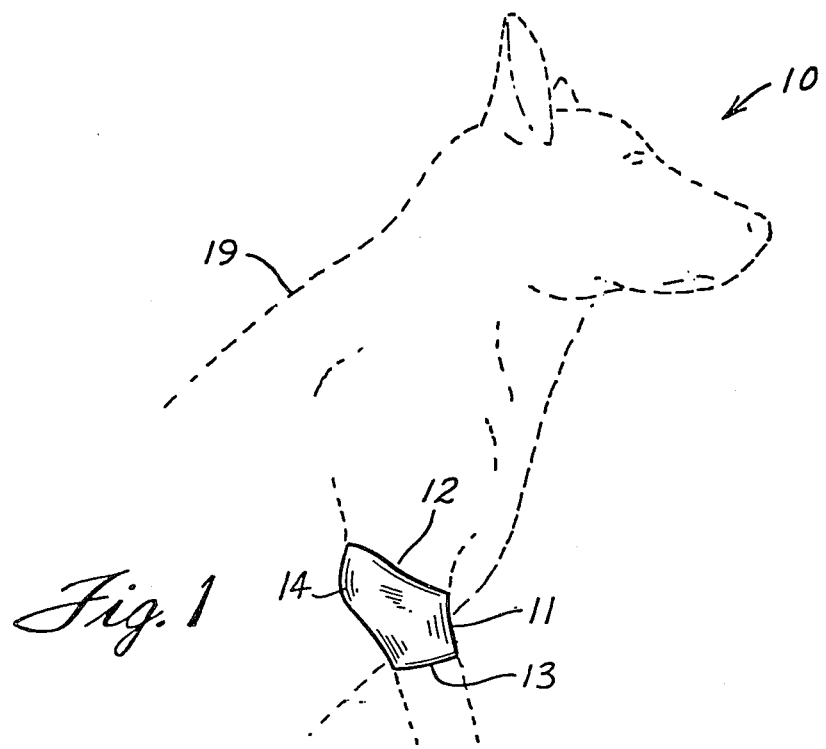
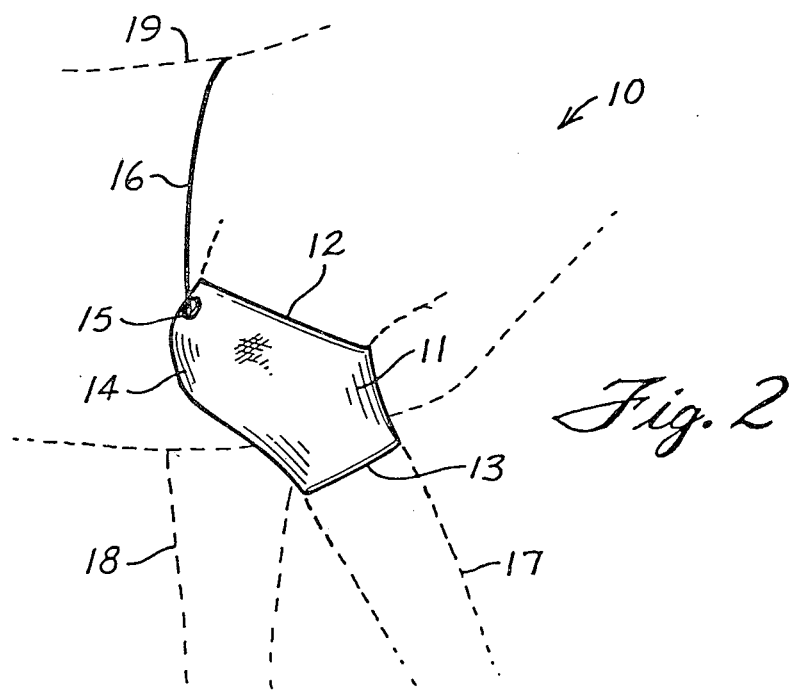

PROTECTIVE ELBOW PAD FOR DOGS AND METHOD

BACKGROUND OF THE INVENTION

This invention relates to an elbow pad for canines, and more particularly relates to an elbow pad of laminated construction and to methods of using the pad to treat calluses on the elbows of canines.

Calluses on elbows are a problem unique to canines rather than other animals. The main reason for this is that dogs when lying down wear out the hair at the elbow which is practically all bone and then calluses are formed causing pain and itching to the dog. Removal of such calluses by a veternarian is prohibitive because of the high cost, and even if an operation is performed, the calluses eventually grow back by virtue of the dog lying down on hard floors.

It is customary in the treatment of calluses to apply some type of medication to the callus followed by a covering of sorts. This has not proved to be altogether successful however, since the dog pulls the covering off and then licks away the medication.

Attempts have been made in treating calluses on dog elbows to strap or tie around the elbow of the dog protector or a pad. Such attempts have proved to be otherwise unsuccessful since they generally resulted in a cutting off of the circulation or otherwise caused discomfort to the dog because of the tight binding. Adhesive bandages have not proved to be beneficial in the treatment of dog elbow calluses because of the growth of hair in the elbow region. While the bandage once applied is effective to cover the medicated area, the removal of the bandage is injurious because all of the hair in the adhesive areas of the bandage is removed with the bandage.

The prior art is replete with pads, protectors, and coverings, for humans and animals. For example, in U.S. Pat. No. 386,630, a horse boot is disclosed to protect the back of the leg of the horse, and which includes a hinged construction between upper and lower parts and the boot is attached to the horse with several straps that extend around the leg of the horse outside the boot. U.S. Pat. No. 3,990,440, shows an elbow protector for humans which includes a shaped foam pad held in position by a tubular fabric sleeve. Further, an elbow protector for humans is disclosed in U.S. Pat. No. 1,846,835, having a laminated construction of an outer leather cover and several inner fabric protective layers which are stitched to form a quilt-like pad. A strap is passed around the arm of the wearer to connect the elbow protector to the body. Other human knee pads and heel supports for horses may be found and are typified by U.S. Pat. Nos. 1,862,303; 2,122,627; and 3,124,919. While all of these devices are successful for their intended purposes, none relate specifically to a protector for the elbows of a dog which includes a strap arrangement for maintaining the elbow protectors in an upper position on the elbows of the dog and which extend over the animal's shoulders or back. Further, such prior art devices do not set forth any type of elbow pads for dogs that can be used to cure or help to prevent calluses from forming on canines.

These disadvantages of the prior art are overcome with the present invention, and commercially acceptable embodiments of a canine elbow protector pad and the like are herein provided which are not only fully capable of curing and healing calluses on the elbows of dogs but which are also fully capable of other tasks completely beyond the devices of the prior art. More particularly, however, the embodiments of the present invention are capable of operation with much efficiency and at a substantially reduced cost of construction.

SUMMARY OF THE INVENTION

This invention is for an elbow pad arrangement for canines, combined with a strap which extends over the animal's shoulder or back to hold the pad in position. It further relates to a laminate construction of the elbow pad and to a method of treating calluses on the elbows of canines.

In one particularly ideal embodiment of the present invention, the canine elbow protector pad has a configuration conforming to the elbow of the canine around which it is placed. Right and left pads are provided for the elbows of the front legs of the dog and an elastic strap is attached to both pads and adjusted to hold the pads upwardly in position and then extended over the back or shoulders of the animal. An eylet or grommet is provided in each pad for the purpose of attaching the strap thereto.

In another particularly ideal embodiment of the invention, each elbow pad has an outer layer of tough durable fabric, a foam central layer, and an inside layer of moleskin which is in the form of a soft felt-like material to form the inner surface of the pad.

In a further particularly ideal embodiment of the present invention, an adhesive pad is attached to the felt-like inner layer so that a clean aseptic bandage can be maintained against the elbow of the canine, and after the pad is attached to the felt-like layer of the protector, the protector is pulled up into position on the elbow of the canine.

In yet another particularly ideal embodiment of the present invention, an elbow protector pad for canines is provided and which is adjustable circumferentially in order to vary the size of the openings in the protector to accommodate legs of different sized animals in lieu of manufacturing and necessitating several sizes of pads for various sized animals.

In the broadest concept, any type of material may be employed to construct the pads of the present invention. However, the outer layer of the pad is preferably DACRON cloth, the center layer a soft spongy material such as polyurethane foam, and the inner layer a soft felt-like material such as moleskin. In the adjustable embodiment of the invention, mechanical-type snaps can be employed, or there can be employed if desired, the synthetic material which adheres when pressed together and which is sold under the trademark VELCRO. As is well known, this material includes a hook side and a loop side. When the hook and loop sides are brought together and pressed one to the other, the material adheres. This renders this material particularly suitable therefore in the formation of an endless belt since it is easy to assemble and disassemble the belt when desired. Thus, a strip of VELCRO may be formed into a closed loop by pressing the hook side of one end against the loop side of the other end. To break the loop, it is simply required to separate the hook and loop surfaces.

Accordingly, it is a feature of the present invention to provide an elbow pad which may be readily secured to the leg of a canine in a position to cover the front leg elbow of the animal to prevent the formation of calluses thereon and to isolate the calluses during treatment thereof.

It is another feature of the present invention to provide a canine elbow pad which is particularly adapted for use on dogs and which provides protection during treatment of elbow calluses but which is light in weight and simple in construction and which may be easily attached to the leg of the dog so as not to hinder the normal activities of the animal.

It is a further feature of the present invention to provide an elbow pad for the front leg of dogs including a soft spongy cushion formed of foam and having an adjustable strap connected thereto for securing the pad to the leg of the dog and which will accommodate leg sizes that vary.

It is yet another feature of the present invention to provide a pair of elbow pads for the front legs of a canine animal and which pair of pads (right and left) are joined by an elastic band which passes over the withers of the animal to support the pair of pads at the proper height along the front legs of the animal.

It is a still further feature of the present invention to provide a composite laminated elbow pad for canines having a center foam layer bounded by a layer of DACRON cloth and a layer of moleskin of felt-like consistency, with an adhesive backing.

It is also a further feature of the present invention to provide an elbow pad for canine calluses wherein the inner surface of the pad adjacent the callused portion of the elbow of the dog carries an adhesive bandage for covering the medicated area of the front leg of the animal.

These and other features and advantages of the present invention will become apparent from the following detailed description, wherein reference is made to the figures in the accompanying drawings.

IN THE DRAWINGS

FIG. 1 is a pictorial representation of a canine animal in the sitting position and having applied to the right foreleg the elbow pad of the present invention.

FIG. 2 is a pictorial representation of a canine animal as seen in FIG. 1 but with the animal in the standing position and with the elbow pad of the present invention affixed to the right foreleg.

DETAILED DESCRIPTION

Figure 3:
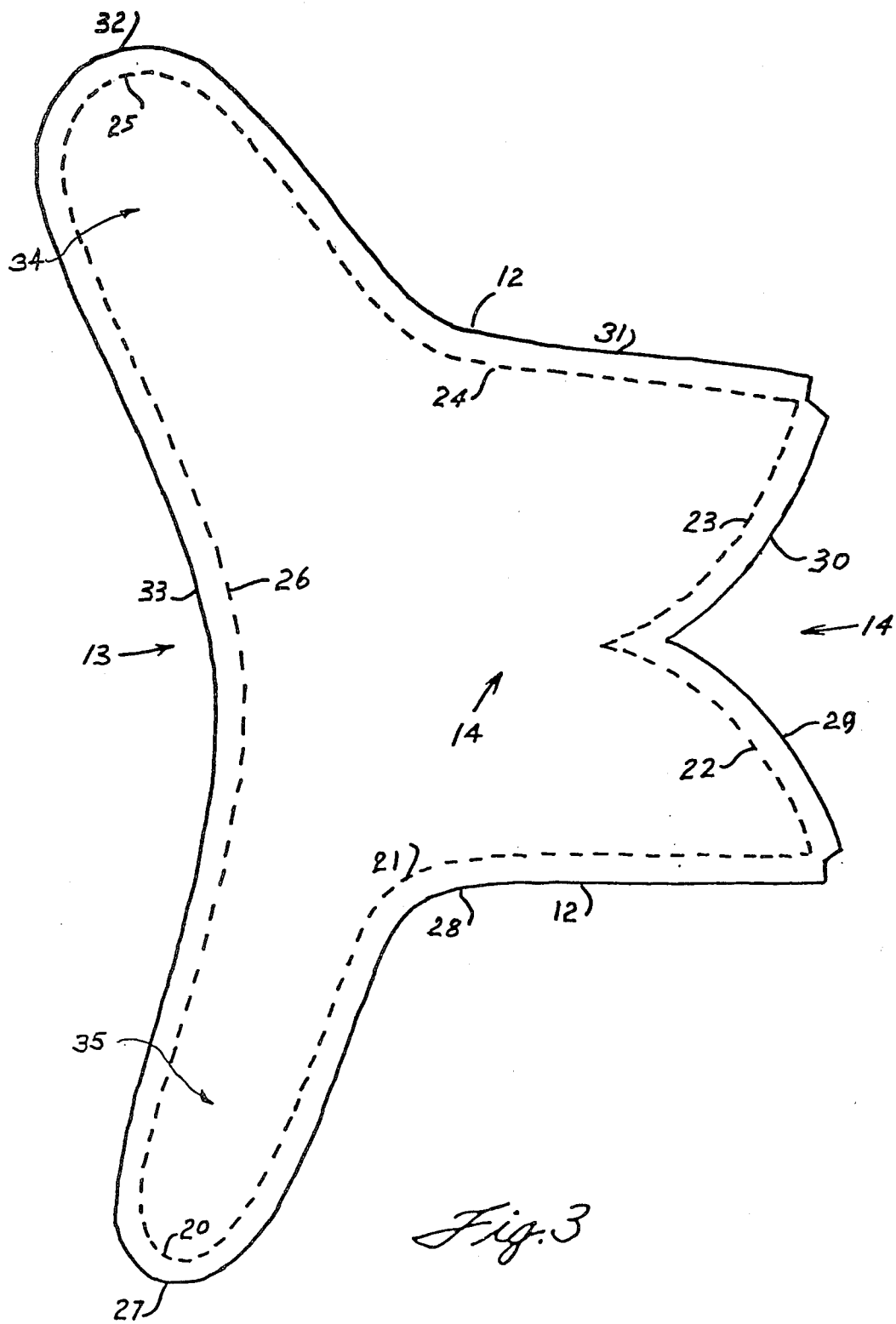
FIG. 3 is a pictorial representation of a pattern used for making the elbow pad of the present invention and with the material laid out prior to sewing of the two seams.

In FIG. 1 there will be seen a pictorial representation of a canine 10 having affixed to the right foreleg the elbow pad 11 of the present invention. The dog is shown in the sitting position and the pad 11 will be seen to include a top opening 12 facing the head of the dog and a bottom opening 13 facing the foot of the dog. An enlarged portion 14 is included for the purpose of accommodating the elbow of the dog. This enlarged portion 14 can be better seen in FIG. 2 which is a view similar to FIG. 1 but with the dog in the standing position and with the right foreleg slightly raised.

With further reference to FIG. 2, the enlarged portion 14 includes therein an eyelet or grommet 15 which is stamped into the pad 11 after the pad 11 is manufactured. The purpose of the eyelet 15 is to provide for the attachment thereto of an elastic band 16 which passes from eyelet 15 over the shoulders of the canine 10 and to the eyelet of the pad which is on the left foreleg of the dog, but which is not shown herein. It should be understood, however, that when speaking of the elbow pad 11 shown in FIGS. 1 and 2 on the right foreleg of the dog, the same applies to an identical elbow pad on the left foreleg of the dog but which left pad has not been specifically illustrated for the sake of simplicity and clarity.

In any event, it should be apparent that the elastic band 16 functions to hold both the right pad 11 and the left pad (not shown) in place on the forelegs of the dog, and prevents the pads from slipping down below the elbow of the dog. The band 16 is also a convenient way of keeping a pair of the pads together when they are not in use.

The pads 11 in FIGS. 1 and 2 are easily attached and removed from the dog 10. For example, to attach the pads, the foreleg 17 is raised and the dog's paw is placed into opening 12 and passed out of opening 13. The pad 11 is then grasped with the band and moved up the leg 17 of the dog until the portion 14 covers the elbow of the dog. With the right pad in place, the left side pad is moved over the back 19 of the dog so that the elastic band 16 crosses over the back 19 of the dog. The left side pad is then pulled upwardly over the left foreleg 18 of the dog in the fashion described above, with the result that both the left pad and the right pad are biased upwardly by the band 16 and thereby held in place on both of the forelegs of the dog 10.

With reference now to FIG. 3, there will be seen a pattern for making the pad 11 of FIGS. 1 and 2. The three materials preferred for the pad are an inner foam layer and two outer layers, one of DACRON and one of moleskin. Thus, the first step in the manufacture of the pad is to cut the various materials to the required shape. Thus, the inner foam layer is cut to the shape of the inside lines 20-26, while the outer layers of DACRON and moleskin are cut to the shape of the outside set of lines 27-33. It should be apparent that the foam layer will be smaller than the two layers of DACRON cloth and moleskin so that the foam can be sandwiched between the cloth layer and the moleskin layer, that has an adhesive backing thus keeping the foam layer in place.

In any event, the pieces are cut to shape and the foam layer is arranged between the cloth layer and the moleskin layer. A seam is then sewn along the lines 20-26 to join the cloth layer and the moleskin layer, and with the foam layer therebetween. With the cloth layer forming the outside and the moleskin on the inside, a second seam is sewn along the lines 22 and 23 to form the enlarged portion 14 of the pad. The flap-like portions 34 and 35 are then overlapped to the required extent to form opening 13 and are sewn or stitched together. The size of the opening 13 is smaller than the elbow of the dog so the pad cannot be pulled wholly above the elbow.

Figure 4:
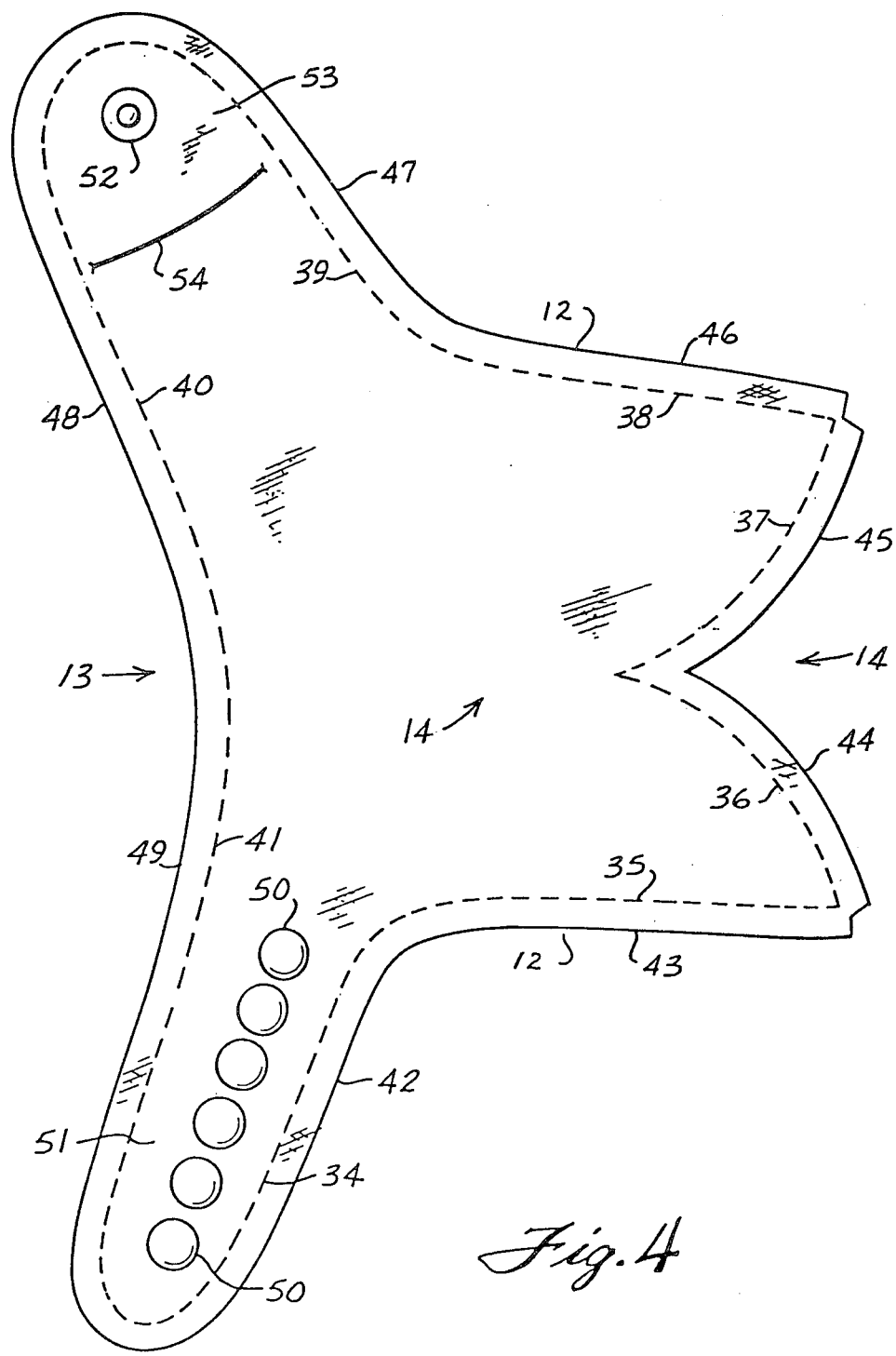
FIG. 4 is a view similar to that of FIG. 3 but showing a pattern used to make an embodiment of the elbow pad of the present invention and with the material laid out prior to sewing of the two seams.

Referring now to FIG. 4, a pattern is seen for an embodiment of the invention where the opening 13 is adjustable to fit and accomodate different sized dogs.

The three materials preferred again for the pad are an inner foam layer and two outer layers, one of DACRON and one of moleskin. Thus, the first step in the manufacture of the pad of FIG. 4 is to cut the various materials to the required shape. Thus, the inner foam layer is cut to the shape of the inside lines 34–41, while the outer layers of DACRON and moleskin are cut to the shape of the outside set of lines 42–49. The foam layer is smaller than the layers of DACRON cloth and moleskin so that the foam can be sandwiched between the cloth and the moleskin layer, that has an adhesive backing, thus, keeping the foam layer in place.

After the pieces are cut to shape, the foam layer is placed on the adhesive backing of the moleskin layer, and the cloth layer is placed over the foam layer. A seam is then sewn along the lines 34–41 to join the cloth layer and the moleskin layer, and with the foam layer therebetween. With the cloth layer forming the outside and the moleskin on the inside, a second seam is sewn along the lines 36 and 37 to form the enlarged portion 14 of the pad. This completes the pad with the DACRON cloth layer forming the outside surface of the pad and with the moleskin on the inside or interior of the pad. The foam layer is sandwiched therebetween as hereinbefore noted.

In order to provide for the adjustment of the opening 13, a series of snaps are provided along the section 51 and of the female type, and with the male snap 52 set in section 53 of the pad. A slit 54 is provided in section 53 and in the moleskin layer to receive the section 51 which extends beyond the snap 52 when the two ends 51 and 53 are joined. While six snaps 50 are shown in FIG. 4, obviously any number may be provided and six is only for the purpose of illustration of the concepts of the invention. It should be further understood that in the manufacture of either of the embodiments of FIGS. 3 and 4, that finishing seams are also to be provided. That is, the outer lines 27–33 and 42–49 are not left in loose relationship but are finished off by standard tuck procedures, or binding material.

As noted hereinbefore, any type of material may be employed to construct the pads of the present invention. However, the outer layer of the pad is preferably DACRON cloth, the center layer a soft spongy material such as polyurethane foam, and the inner layer a soft felt-like material such as moleskin with adhesive backing. In the adjustable embodiment of FIG. 4, mechanical-type snaps 50, 52 can be employed, or there can be employed if desired, the synthetic material which adheres when pressed together and which is sold under the trademark VELCRO. As is well known, this material includes a hook side and a loop side. When the hook and loop sides are brought together and pressed one to the other, the material adheres. This renders this material particularly suitable therefore in the formation of an endless belt since it is easy to assemble and disassemble the belt when desired. Thus a strip of VELCRO may be formed into a closed loop by pressing the hook side of one end 51 against the loop side of the other end 53. To break the loop, it is simply required to separate the hook and loop surfaces.

With reference again to FIG. 2, the pads 11 are held in place by a strong elastic band 16 that passes over the back 19 at the shoulders and attached to the eyelets 15 of the pads. With the pads 11 on the animal, the band 16 is stretched firmly from one eyelet 15 to the other and is then cut to size and tied or sewn to the eyelets 15. A firm fit in this fashion will keep the pads in their proper place on the forelegs 17 and 18 of the dog.

The inner liner is a sturdy waterproof moleskin which looks like felt and is very soft. The foam layer between the cloth and the moleskin is preferably of about one quarter inch in thickness. When medication is used to soften calluses, they are first washed with warm water and dried. The medication is not applied directly to the elbow pad 11 but to an adhesive backed dressing layer or pad that is adhered to the moleskin. The elbow pad is then slipped up the foreleg of the dog on both sides, and the animal will be unable to remove the pad or the medication therein. Before applying new medication, the calluses should be washed again with warm water using a medicated soap. The preferred medication in this case in SULFODENE. The pads can be worn both day and at night, however, they are not required at night because the dog sleeps and there is no pressure on the calluses. It is preferred to allow the dog to get used to wearing the pads by taking it for walks while on a leash.

The preferred adhesive backed dressing is a material sold under the mark TELFA. The adhesive side of the dressing is placed on the moleskin and the medication can be applied to the callus or to the dressings. The pad is then slipped up the leg of the dog, and with the dressing opposite the callus. This will keep the pad clean and prevent the medication from fouling the moleskin. When more medication is needed, the pad is just slipped down, the medication is applied, and then the pad is returned to cover the elbow of the dog. This eliminates the need for bandages with the disadvantage of removing hair from the dog when the bandage is removed.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. A canine elbow protector pad for covering a calloused elbow of a foreleg of a canine comprising,
   a closed loop of soft pliable material having an upper opening and a lower opening, and an elbow accomodating enlargement in one side adjacent the upper opening,
   said lower opening being of a size less than the elbow so that the pad cannot pass upwardly above the elbow, and said upper opening being of a size to loosely encircle the portion of a canine foreleg above the elbow, and a length of elastic material, one end of which is attached adjacent said upper opening of said elbow protector pad, extending over the back of the canine, to hold said pad in place adjacent the elbow, the opposite end of said length of elastic material being fastened to the side of the canine opposite said foreleg.

2. The pad of claim 1 wherein said material comprises a composite laminate having an inner foam layer, and moleskin and DACRON cloth on the outsides, respectively.

3. The pad of claim 1 further comprising means for adjusting the size of the lower opening.

4. The pad of claim 3 wherein said adjusting means includes a series of female snaps on one portion of the material and a corresponding and mating male snap on another portion of the material.

5. A method for treating callouses on the elbows of forelegs of canines comprising the steps of
   applying a medication to the callouses, positioning a pad of soft pliable material on each elbow of forelegs of the canine to cover a callous, each pad being a closed loop of soft material having upper and lower openings therein and an enlargement to accomodate the elbow of the canine, the upper opening of each pad fitting loosely around the elbow and the lower opening being of a size to prevent the pad from passing upwardly over the elbow, and connecting elastic means between said pads, and extending the elastic means over the back of the canine to hold said pads in a position on the elbows of the canine.

6. The method of claim 5 further comprising adjusting the length of the elastic means between said pads.

7. The method of claim 5 further comprising adhering a bandage to the interior of a pad in a position to cover a callous, prior to applying the pad to the elbow.

8. A pair of canine elbow protector pads for treating calloused elbows of a canine comprising first and second closed loops of soft pliable material each having an upper opening and a lower opening, and an enlarged portion between the openings to loosely accomodate an elbow of a canine, said pads being adapted to be positioned around the respective elbows of the forelegs of a canine, each pad having a lower opening of a size smaller than the upper opening so that the pads cannot move upwardly over the elbows, and an elastic band connected between the pads and adjacent the upper openings of the pads and extendable over the back of the canine to resist downward slipping of the pads from the elbows to thus maintain the pads in position on the elbows.

9. The pads of claim 8 wherein said soft material of each pad comprises a composite laminate of an inner foam layer within moleskin and DACRON cloth outer layers, respectively.

10. The pads of claim 9 further comprising means for adjusting the size of the lower opening of each pad.

11. The pads of claim 8 further comprising means for adjusting the length of the elastic band.

* * * * *